US011998508B2

(12) United States Patent
Han et al.

(10) Patent No.: US 11,998,508 B2
(45) Date of Patent: Jun. 4, 2024

(54) MASSAGER CONTROLLING APPARATUS AND METHOD THEREOF

(71) Applicant: Ceragem Co., Ltd., Chungcheongnam-do (KR)

(72) Inventors: Sang Cheol Han, Chungcheongnam-do (KR); Dong Myoung Lee, Chungcheongnam-do (KR); Ki Sung Kim, Chungcheongnam-do (KR); Sang Hee Kim, Seobuk-gu (KR)

(73) Assignee: Ceragem Co., Ltd., Chungcheongnam-do (KR)

( * ) Notice: Subject to any disclaimer, the term of this patent is extended or adjusted under 35 U.S.C. 154(b) by 270 days.

(21) Appl. No.: 16/378,420

(22) Filed: Apr. 8, 2019

(65) Prior Publication Data

US 2019/0328606 A1 Oct. 31, 2019

(30) Foreign Application Priority Data

Apr. 26, 2018 (KR) ........................ 10-2018-0048419

(51) Int. Cl.
*A61H 7/00* (2006.01)

(52) U.S. Cl.
CPC ....... *A61H 7/00* (2013.01); *A61H 2201/0138* (2013.01); *A61H 2201/02* (2013.01); *A61H 2201/12* (2013.01); *A61H 2201/1669* (2013.01); *A61H 2201/5007* (2013.01); *A61H 2201/5058* (2013.01); *A61H 2201/5071* (2013.01); *A61H 2205/081* (2013.01)

(58) Field of Classification Search
None
See application file for complete search history.

(56) References Cited

U.S. PATENT DOCUMENTS 5,265,590 A * 11/1993 Takagi ............... A61H 15/0078 601/52
5,792,080 A * 8/1998 Ookawa ................... A61H 1/00 601/102
6,117,094 A * 9/2000 Fujii ...................... A61H 15/00 601/102
6,224,563 B1 * 5/2001 Nonoue ............. A61H 15/0078 601/111
2004/0225239 A1 * 11/2004 Yamamoto ......... A61H 15/0078 601/84
2005/0222523 A1 * 10/2005 Splane ................... A61H 1/001 601/24

(Continued)

FOREIGN PATENT DOCUMENTS

CN 204319195 5/2015
JP H06125954 A 5/1994

(Continued)

*Primary Examiner* — Bradley H Philips
*Assistant Examiner* — Savannah L Gabriel
(74) *Attorney, Agent, or Firm* — Morrison & Foerster LLP

(57) ABSTRACT

A massager controlling apparatus and a method thereof are provided. The massager controlling apparatus according to an embodiment of the present disclosure includes a setting part configured to set a massage mode and a control part configured to control a moving speed of a driving module performing massage to adjust at least one of an operation time of a corresponding massage pattern and massage strength according to the massage mode set by the setting part and a body shape of a user.

11 Claims, 6 Drawing Sheets

(56) References Cited

U.S. PATENT DOCUMENTS

| | | | | |
|---|---|---|---|---|
| 2006/0089573 | A1* | 4/2006 | Park | A61H 7/001 601/103 |
| 2013/0110007 | A1* | 5/2013 | Jeon | A61B 5/4566 600/594 |
| 2013/0289451 | A1* | 10/2013 | Yu | A61H 7/00 601/15 |
| 2014/0207333 | A1 | 7/2014 | Vandivier et al. | |
| 2014/0277300 | A1* | 9/2014 | Lee | A61H 15/0078 607/96 |
| 2015/0040315 | A1* | 2/2015 | Gersin | A47D 15/003 5/417 |
| 2015/0182411 | A1* | 7/2015 | Lin | A61H 7/007 601/102 |
| 2017/0360641 | A1* | 12/2017 | Nakata | A61H 7/007 |

FOREIGN PATENT DOCUMENTS

| | | | | |
|---|---|---|---|---|
| JP | 06339505 | | 12/1994 | |
| JP | 2000-060923 | | 2/2000 | |
| JP | 2000342644 | A | 12/2000 | |
| JP | 2002-035070 | | 2/2002 | |
| JP | 2002-113061 | | 4/2002 | |
| JP | 2006-340898 | | 12/2006 | |
| JP | 2008-272041 | | 11/2008 | |
| JP | 4938183 | | 5/2012 | |
| JP | 5342993 | B2 | 8/2013 | |
| JP | 2015000258 | A | 1/2015 | |
| JP | 2017-221251 | | 12/2017 | |
| KR | 10-2016-0083265 | | 7/2016 | |
| KR | 10-1679584 | | 11/2016 | |
| RU | 2187294 | | 8/2002 | |
| RU | 2392917 | | 6/2010 | |
| RU | 2454215 | | 6/2012 | |
| RU | 126936 | | 4/2013 | |
| RU | 149358 | | 12/2014 | |
| RU | 2013144373 | | 5/2015 | |
| WO | 02069880 | A1 | 9/2002 | |
| WO | WO-02069880 | A1 * | 9/2002 | A61H 39/00 |

* cited by examiner

MASSAGER CONTROLLING APPARATUS AND METHOD THEREOF

CROSS-REFERENCE TO RELATED APPLICATION

This application claims priority to and the benefit of Korean Patent Application No. 2018-0048419, filed on Apr. 26, 2018, the disclosure of which is incorporated herein by reference in its entirety.

BACKGROUND

1. Field of the Invention

The present disclosure relates to a massager, and more particularly, to a massager controlling apparatus configured to adjust operation times and massage strength for massage patterns of a spinal massager, a massager, a thermal apparatus, and the like and a method thereof.

2. Discussion of Related Art

A general bed-type massager measures a lower back length of a user and operates according to a set pattern of massage, and in this case, a moving speed of a driving body is always uniform. Here, since each of a load applied to the driving body and a length for massage varies according to the weight and lower back length of the user, massage operation times can be different.

To this end, a method of unifying times at which an entire massage is ended by performing additional massage or adjusting a time at a particular movement has been provided.

However, in the above-described operation, since massage patterns are practically changed, different massages are provided to users. Particularly, in the case such as demonstration or the like in which a plurality of massagers are used for an effect of massage for users, since the users cannot be provided with the same massage, a practical comparison is difficult and thus effectiveness is low.

Meanwhile, when the user arbitrarily adjusts a massage time, since only the massage time is changed, an entire pattern of the massage is not performed or a part of the pattern is repeatedly performed, and thus a practical massage effect cannot be provided.

Further, since massage strength is gradationally specified by a mechanical structure of the driving body configured to provide massage according to each product, a design change and a manufacturing process of the driving body become complicated so as to provide the massage at strength not in a specified grade.

SUMMARY OF THE INVENTION

The present disclosure is directed to providing a massager controlling apparatus capable of easily adjusting a massage operation time and massage strength and a method thereof.

According to an aspect of the present disclosure, there is provided a massager controlling apparatus including a setting part configured to set a massage mode, and a control part configured to control a moving speed of a driving module performing a massage to adjust at least one of an operation time of a corresponding massage pattern and massage strength according to the massage mode set by the setting part and a body shape of a user.

In the embodiment, the control part may control a transferring motor configured to horizontally transfer the driving module to adjust the moving speed of the driving module.

In the embodiment, the control part may include a body shape calculation part configured to scan a body of the user to calculate at least one of a weight and a spinal length of the user, and a time adjusting part configured to control the moving speed of the driving module on the basis of the calculated body shape information to adjust the operation time of the corresponding massage pattern.

In the embodiment, the time adjusting part may adjust so that the set massage pattern may be ended at the same time regardless of the calculated weight and spinal length of the user.

In the embodiment, the time adjusting part may calculate the moving speed of the driving module on the basis of a predetermined standard operation time and the spinal length of the user for the corresponding massage pattern to adjust the moving speed of the driving module.

In the embodiment, the setting part may include an operation time adjusting part configured to set the operation time of the corresponding massage pattern, and the time adjusting part may adjust the moving speed of the driving module so that the corresponding massage pattern may be ended according to the set operation time.

In the embodiment, the time adjusting part may adjust the moving speed of the driving module on the basis of the set operation time and the spinal length of the user.

In the embodiment, the setting part may include a strength selection part configured to select strength of the massage mode and a strength increasing/decreasing selection part configured to select increasing/decreasing of the selected massage strength to minutely adjust the massage strength, and the control part may include a strength control part configured to control the driving module so that the driving module may be driven at the selected massage strength and a strength adjusting part configured to increase or decrease the moving speed of the driving module according to the increasing/decreasing selection to adjust the massage strength.

In the embodiment, the strength increasing/decreasing selection part may select the corresponding massage strength in an analog manner.

According to another aspect of the present disclosure, there is provided a massager controlling method including setting a massage mode, scanning a body of a user and calculating at least one of a weight and a spinal length of the user, and controlling a moving speed of a driving module on the basis of the calculated body shape information and adjusting an operation time of a corresponding massage pattern.

In the embodiment, the adjusting may include adjusting a transferring motor configured to horizontally transfer the driving module to adjust the moving speed of the driving module.

In the embodiment, the adjusting may include adjusting so that the set massage pattern may be ended at the same time regardless of the calculated weight and the spinal length of the user.

In the embodiment, the adjusting may include calculating the moving speed of the driving module on the basis of a predetermined standard operation time and the spinal length of the user for the corresponding massage pattern to adjust the moving speed of the driving module.

In the embodiment, the setting may include setting the operation time of the corresponding massage pattern and the adjusting may include adjusting the moving speed of the driving module so that the corresponding massage pattern may be ended according to the set operation time.

In the embodiment, the adjusting may include adjusting the moving speed of the driving module on the basis of the set operation time and the spinal length of the user.

According to still another aspect of the present disclosure, there is provided a massager controlling method including setting massage strength and a massage pattern, controlling a driving module so that the driving module is driven at the selected massage strength, selecting increasing/decreasing of the selected massage strength to minutely adjust the massage strength, and increasing or decreasing a moving speed of the driving module according to the increasing/decreasing selection and adjusting the massage strength.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
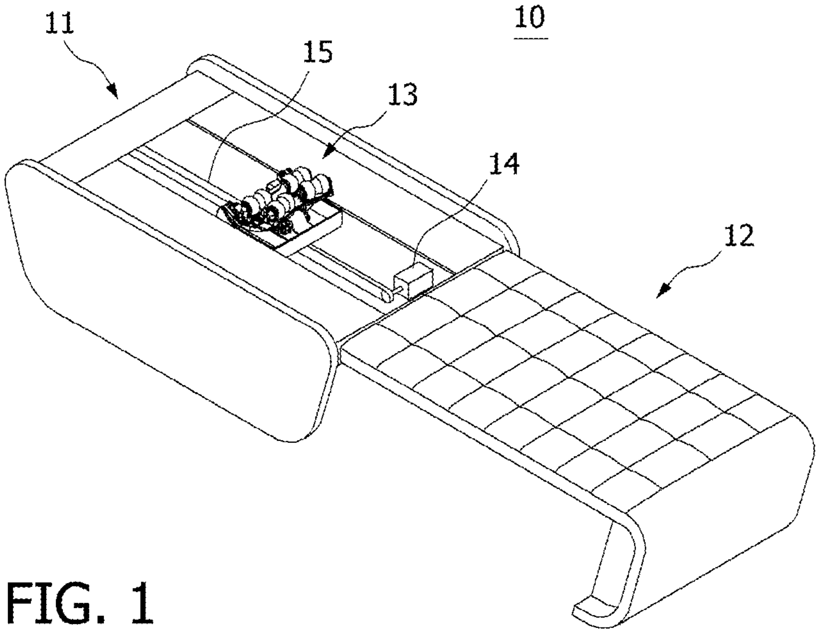
FIG. 1 is a perspective view illustrating a massager according to an embodiment of the present disclosure.

Hereinafter, exemplary embodiments of the present disclosure will be described in detail with reference to the accompanying drawings which may allow one of ordinary skill in the art to easily perform the present disclosure. The present disclosure may be implemented in various forms and is not limited to the following embodiments. Components not related to the description are omitted in the drawings to clearly describe the present disclosure, and the same reference symbols are used for the same or similar components in the description.

Hereinafter, a massager controlling apparatus according to one embodiment of the present disclosure will be described in more detail with reference to the drawings. FIG. 1 is a perspective view illustrating a massager according to an embodiment of the present disclosure, and FIG. 2 is a block diagram schematically illustrating the massager in FIG. 1.

Figure 2:
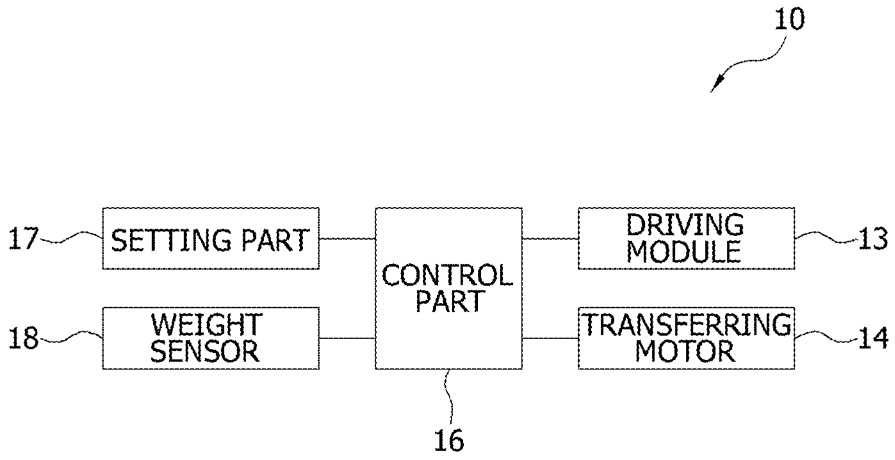
FIG. 2 is a block diagram schematically illustrating the massager in FIG. 1.

Referring to FIGS. 1 and 2, a massager 10 to which a massager controlling apparatus 100 according to the embodiment of the present disclosure is applied includes an upper body 11, a lower body 12, a driving module 13, a transferring motor 14, and a transferring part 15.

Here, the massager 10 may include a spinal massager, a massager, or a thermal apparatus, may be an apparatus configured to move on body parts of a user using the transferring motor 14 to repeatedly vibrate or tap the body parts, and has no limitation on a shape thereof.

Further, as shown in FIG. 1, the massager 10 includes a bed type in which a user lies to receive massage or a chair type in which a user sits to receive massage and has no limitation on the shape thereof.

The upper body 11 and the lower body 12 may be disposed parallel with each other. The upper body 11 may be provided with a vacant space in a portion thereof and may be provided with the driving module 13, the transferring motor 14, and the transferring part 15 configured to perform massage. The lower body 12 may slide to one side from the upper body.

The driving module 13 may perform at least one of the massage and thermal treatment for each body part of the user. Here, the driving module 13 may be a ceramic module for the thermal treatment. The driving module 13 may move in one direction in the upper body 11 by the transferring motor 14 and the transferring part 15. Further, in the driving module 13, a height of a portion which comes into contact with the body according to massage strength may be adjusted.

As shown in FIG. 2, the massager 10 may further include a control part 16, a setting part 17, and a weight sensor 18.

The control part 16 may control setting and performance of a massage mode. In the setting part 17, a massage mode which will be performed may be set by the user. The weight sensor 18 may be provided in the driving module 13 to sense a body pressure of the user.

Figure 3:
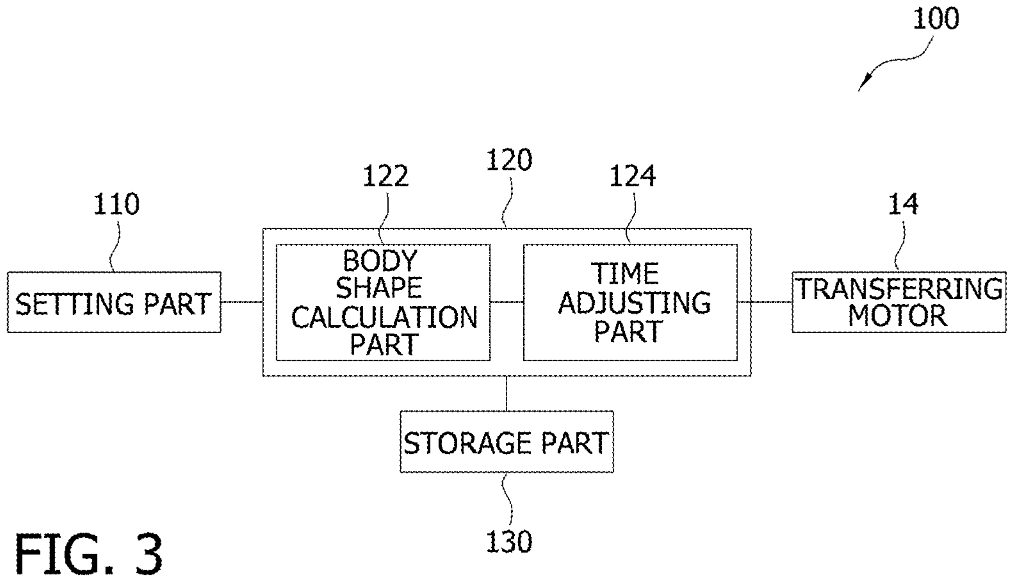
FIG. 3 is a block diagram illustrating a massager controlling apparatus according to the embodiment of the present disclosure.

The controlling apparatus 100 configured to control the above-described massager 10 will be described in more detail. FIG. 3 is a block diagram illustrating the massager controlling apparatus according to the embodiment of the present disclosure.

Referring to FIG. 3, the massager controlling apparatus 100 includes a setting part 110, a control part 120, and a storage part 130. Here, the setting part 110 and the control part 120 may be implemented as parts of the control part 16 and the setting part 17 in FIG. 2.

The setting part 110 may set a massage mode of the massager 10. In the setting part 110, the massage mode may set by the user. Here, the massage mode may include a massage pattern, the massage strength, and a massage operation time.

The control part 120 may control a moving speed of the driving module 13 configured to perform the massage to adjust at least one of an operation time and massage strength of a corresponding massage pattern according to a massage mode set by the setting part 110 and a body shape of the user.

Here, the control part 120 may control the transferring motor 14 configured to horizontally transfer the driving module 13 to adjust the moving speed of the driving module 13. The control part 120 may include a body shape calculation part 122 and a time adjusting part 124.

The body shape calculation part 122 may scan the body of the user to calculate at least one of a weight and a spinal length of the user. Here, the spinal length may be a lower back length of a user who receives the massage.

In this case, the body shape calculation part 122 may calculate the weight of the user according to a body pressure sensed by the weight sensor 18 while scanning the user using the driving module 13.

Further, the body shape calculation part 122 may sense currents for each location of the transferring motor 14 to calculate the spinal length of the user according to variation of currents.

The time adjusting part 124 may control the moving speed of the driving module 13 on the basis of body shape information calculated from the body shape calculation part 122 to adjust the operation time of the corresponding massage pattern.

Figure 4:
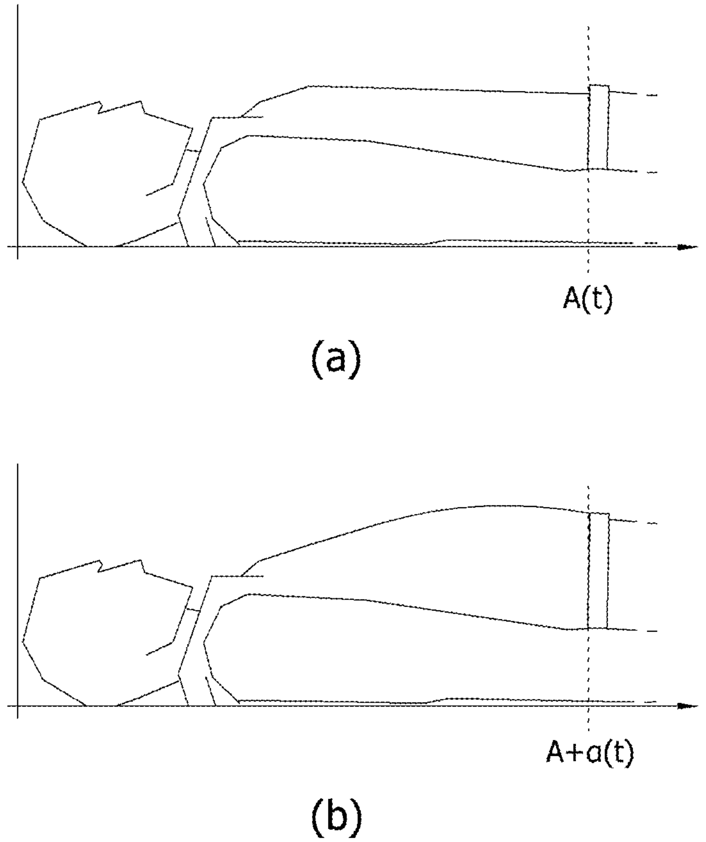
FIG. 4 is a view for describing moving speeds of a driving module when users have the same height and different weights.

Here, the moving speed of the driving module 13 varies according to the body shape of the user. FIG. 4 is a view for describing moving speeds of the driving module when users have the same height and different weights, and FIG. 5 is a view for describing moving speeds of the driving module when users have the same weight and different heights.

As shown in FIG. 4, when the heights (that is, lower back lengths) are the same but the weights are different, an ending time of the massage varies according to the weight of the user for the same massage pattern. As an example, in the case of FIG. 4A in which the weight is small, the ending time of the massage may be A(t), and on the other hand, in the case of FIG. 4B in which the weight is large, the ending time of the massage may be A+α(t).

Here, when the heights are the same, moving lengths of the driving module 13 are the same. However, since a load applied to the driving module 13 due to a difference between the weights varies, the moving speed of the driving module 13 varies as much as the difference between the weights for the same massage pattern. Accordingly, in the case of FIG. 4B in which the weight is large, a difference a between times for ending the massage occurs in comparison with the case of FIG. 4A in which the weight is small.

Figure 5:
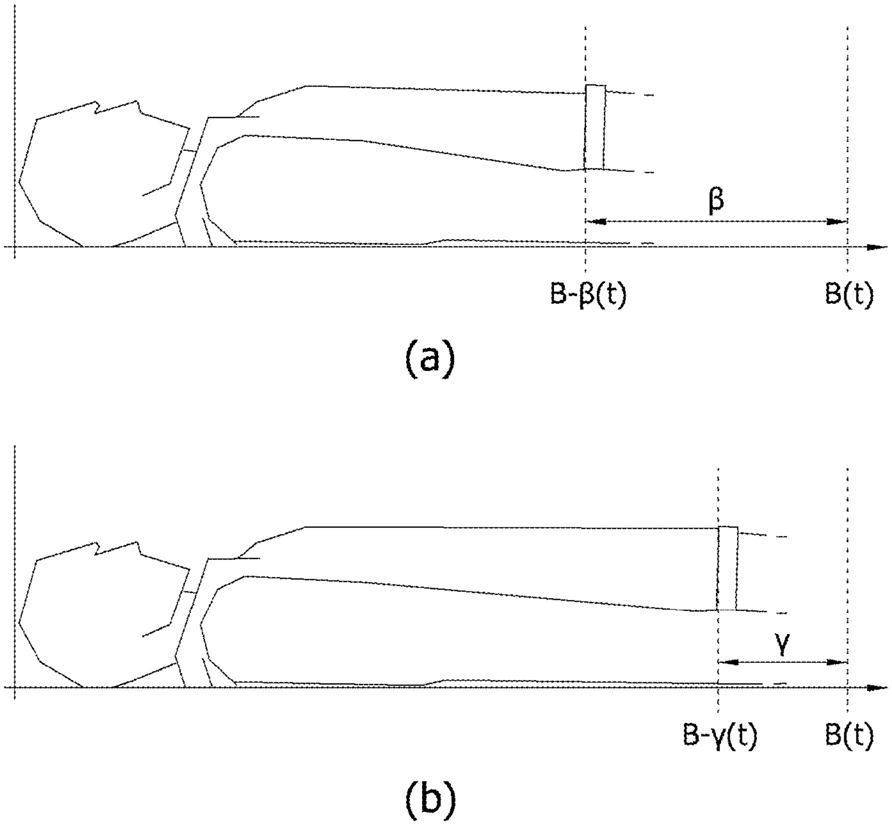
FIG. 5 is a view for describing moving speeds of the driving module when users have the same weight and different heights.

Further, as shown in FIG. 5, when the weights are the same but the heights (that is, the lower back lengths) are different, the ending time of the massage varies according to the height of the user for the same massage pattern. As an example, for the standard ending time B(t) of the corresponding massage pattern, in the case of FIG. 5A in which the height is small, the ending time of the massage may decrease by β and thus may be B−β(t), and on the other hand, in the case of FIG. 5B in which the height is large, the ending time of the massage may decrease by γ and thus may be B−γ(t).

Here, when the weights are the same, loads applied to the driving module 13 are the same. However, since a length in which the driving module 13 should move due to a difference between the heights varies, the moving length of the driving module 13 varies as much as the difference between the heights for the same massage pattern. Accordingly, the case of FIG. 5B in which the height is large may be reduced by a difference (γ−β) between times for ending the massage in comparison with the case of FIG. 5A in which the height is small.

As described above, since the moving speed of the driving module 13 varies according to the body shape of the user for the same massage pattern, users may feel different effects. Particularly, in the case such as a demonstration or the like in which a plurality of users experience an effect of a massage, the massage ending times of the users may be different or provided massage patterns may be different. Accordingly, the massage ending times have to be identically adjusted regardless of the user.

To this end, the time adjusting part 124 may adjust so that the set massage pattern set by the setting part 110 may be ended at the same time regardless of the weight and the spinal length of the user.

More specifically, first, the time adjusting part 124 may adjust so that the moving speed of the driving module 13 may vary uniformly according to variation of the load applied to the driving module 13 by the weight of the user. In this case, the time adjusting part 124 may control in real time by sensing the moving speed of the driving module 13 to follow a target moving speed.

Further, the time adjusting part 124 may calculate the moving speed of the driving module 13 on the basis of a predetermined standard operation time and the spinal length of the user for the corresponding massage pattern. Here, the moving speed of the driving module 13 may be calculated in relation to the spinal length of the user and the standard operation time.

Further, the time adjusting part 124 may control the transferring motor 14 to move the driving module 13 at the adjusted moving speed. As an example, the time adjusting part 124 may control the transferring motor 14 by controlling driving currents of the transferring motor 14.

Accordingly, since the massager controlling apparatus 100 may accurately control the massage time regardless of the body shape of user, reliability of the massage effect may be ensured without deviation for each user.

Figure 6:
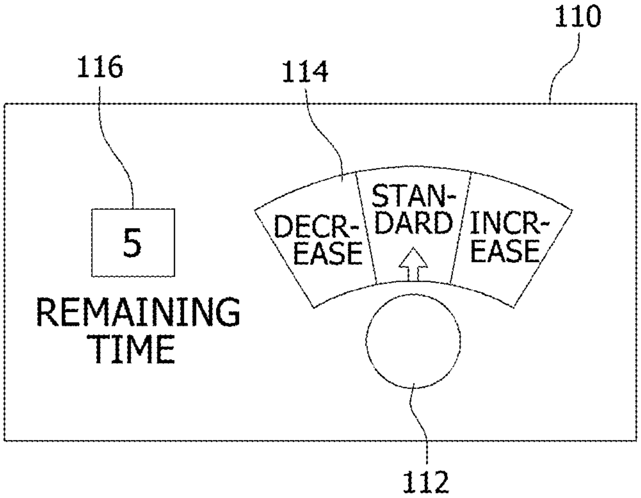
FIG. 6 is a view illustrating an example of a setting part in FIG. 3.
Figure 7:
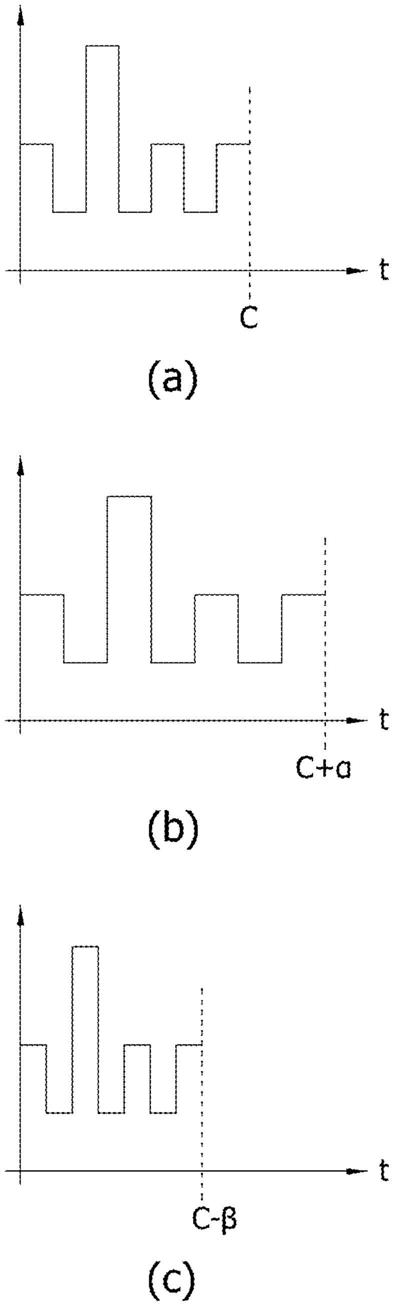
FIG. 7 is a timing diagram illustrating a massage pattern according to adjustment of a massage operation time.

Meanwhile, the massager controlling apparatus 100 may adjust an operation time of the same massage pattern according to selection of the user. FIG. 6 is a view illustrating an example of the setting part in FIG. 3, and FIG. 7 is a timing diagram illustrating the massage pattern according to adjustment of the massage operation time.

To this end, in the setting part 110, the operation time of the corresponding massage pattern may be set by the user. As an example, as shown in FIG. 6, the setting part 110 may include an operation time adjusting part 112, an operation time display part 114, and a remaining time display part 116.

The operation time adjusting part 112 may be a dial-type switch or a button-type switch to select the massage operation time displayed on the operation time display part 114.

The operation time display part 114 may display a massage operation time which will be described below. Here, as described above, standard is provided to perform the corresponding massage pattern at the same time regardless of the body shape of the user, and decrease and increase are provided to adjust the operation time according to the selection of the user and perform the corresponding massage pattern for a decreased or increased time in comparison with the standard.

In FIG. 6, although the operation time display part 114 is shown and described as three grades including the decrease, the standard, and the increase, the decrease and increase may include a plurality of grades or successive grades in an analog manner.

The remaining time display part 116 may display the remaining time of a corresponding massage mode while the massage is performed according to selection of the operation time. Accordingly, the user may easily adjust the massage operation time.

In this case, the time adjusting part 124 may adjust the moving speed of the driving module 13 so that the corresponding massage pattern may be ended according to the operation time set by the setting part 110. That is, the time adjusting part 124 may calculate the moving speed of the driving module 13 on the basis of the set operation time and the measured spinal length of the user.

Here, the time adjusting part 124 may control the driving currents of the transferring motor 14 to move the driving module 13 at the adjusted moving speed.

As shown in FIG. 7, in the case of FIG. 7A in which the massage pattern is performed in a standard moving speed, it is assumed that the standard massage operation time is C(t). Here, the massage pattern has a predetermined shape and may be a strength and speed at which the body of the user is tapped or massaged. That is, the massage pattern may be an operation pattern of the driving module 13.

In this case, in the case of FIG. 7B in which the massage operation time is increased for detailed massage in comparison with the standard massage operation time, the time adjusting part 124 may control so that the massage pattern linearly increases for a set time ($C+\alpha$). That is, the time adjusting part 124 may control the moving speed of the driving module 13 to be decreased and the massage pattern to be increased in a time axis in comparison with the case of the standard moving speed of FIG. 7A to maintain the same massage pattern even when the massage operation time increases.

Further, in the case of FIG. 7C in which the massage operation time is decreased for quick massage in comparison with the standard massage operation time, the time adjusting part 124 may control so that the massage pattern linearly decreases for a set time ($C-\beta$). That is, the time adjusting part 124 may control the moving speed of the driving module 13 to be increased and the massage pattern to be decreased in the time axis in comparison with the case of the standard moving speed of FIG. 7A to maintain the same massage pattern even when the massage operation time decreases.

Accordingly, since the massager controlling apparatus 100 may adjust a massage speed according to a time desired by the user and provide the same massage effect to the user, user convenience functions may be improved.

Information associated with adjustment of the massage operation time in the control part 120 may be stored in the storage part 130. Here, a predetermined standard operation time for each massage pattern, and the moving speed calculated according to measured body shape information (the spinal length and/or the weight) may be stored in the storage part 130.

Figure 8:
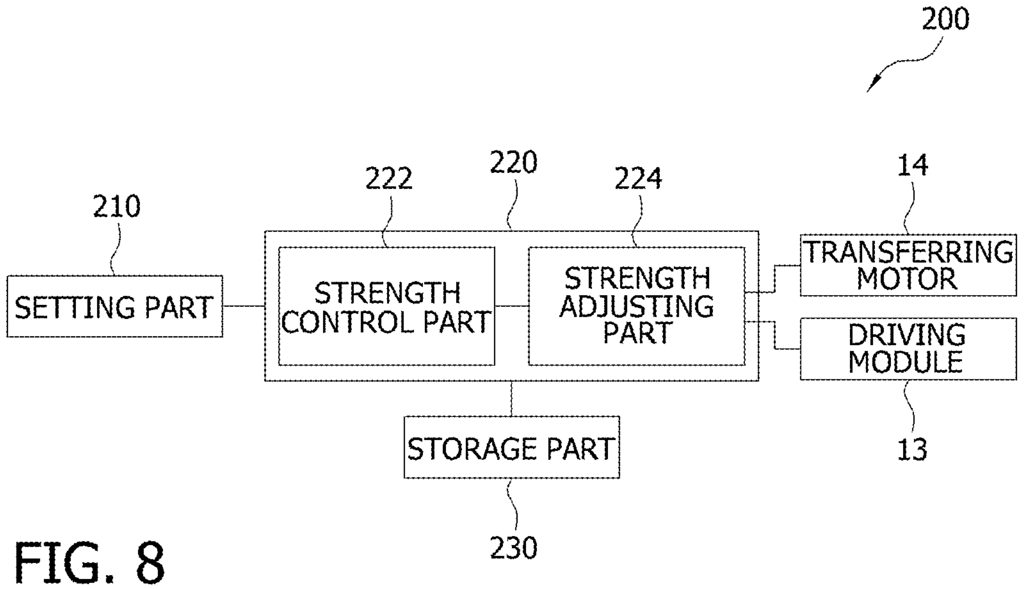
FIG. 8 is a block diagram illustrating another example of the massager controlling apparatus according to the embodiment of the present disclosure.
Figure 9:
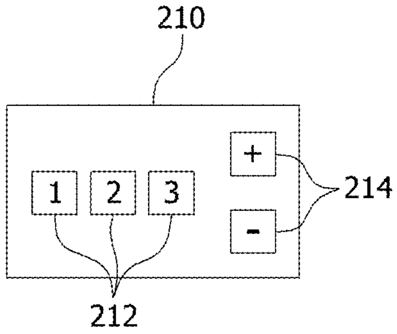
FIG. 9 is a view illustrating an example of a setting part in FIG. 8.

Meanwhile, the massager controlling apparatus according to the embodiment of the present disclosure may provide the massage strength in a successive analog manner. FIG. 8 is a block diagram illustrating another example of the massager controlling apparatus according to the embodiment of the present disclosure, and FIG. 9 is a view illustrating an example of a setting part in FIG. 8.

A massager controlling apparatus 200 includes a setting part 210, a control part 220, and a storage part 230.

The setting part 210 may select or minutely adjust massage strength. As an example, as shown in FIG. 9, the setting part 210 may include a strength selection part 212 and a strength increasing/decreasing selection part 214.

The strength selection part 212 may be provided to select the massage strength. Here, the strength selection part 212 may include a plurality of buttons configured to show graded massage strength but is not limited thereto and may be provided to gradationally select the massage strength according to a number input or the like.

The strength increasing/decreasing selection part 214 may be provided to select increasing/decreasing of the massage strength selected by the strength selection part 212 to minutely adjust the selected massage strength. Here, the strength increasing/decreasing selection part 214 may select the massage strength in an analog manner. In this case, the strength increasing/decreasing selection part 214 may include an increase button (+) or a decrease button (−) but is not limited thereto and may be provided to minutely select the massage strength in the analog manner using a dial or the like. Accordingly, the user may easily adjust desired massage strength.

The control part 220 may adjust the massage strength so that the massage strength set by the setting part 210 may be provided in the analog manner. The control part 220 may include a strength control part 222 and a strength adjusting part 224.

The strength control part 222 may control to drive the driving module 13 with the massage strength set by the setting part 210.

The strength adjusting part 224 may increase or decrease the moving speed of the driving module 13 according to increasing/decreasing selection minutely adjusted by the setting part 210 to adjust the massage strength.

Here, when the moving speed of the driving module 13 increases with respect to the same massage strength, the massage strength felt by the user may increase proportionally to the moving speed, which increases, and when the moving speed of the driving module 13 decreases, the massage strength felt by the user may decrease proportionally to the moving speed, which decreases. Variation of the above-described moving speed of the driving module 13 and the massage strength may be experimentally calculated in advance to be stored in the storage part 230.

Accordingly, the strength adjusting part 224 may adjust the moving speed of the driving module 13 driven with the set massage strength to adjust the massage strength. That is, the massage strength may be minutely adjusted between graded massage strength levels provided by the driving module 13.

Information associated with adjustment of the massage strength in the control part 220 may be stored in the storage part 230. Here, a variation amount of the massage strength according to the massage strength level and the moving speed of the driving module 13 may be stored in the storage part 230.

Figure 10:
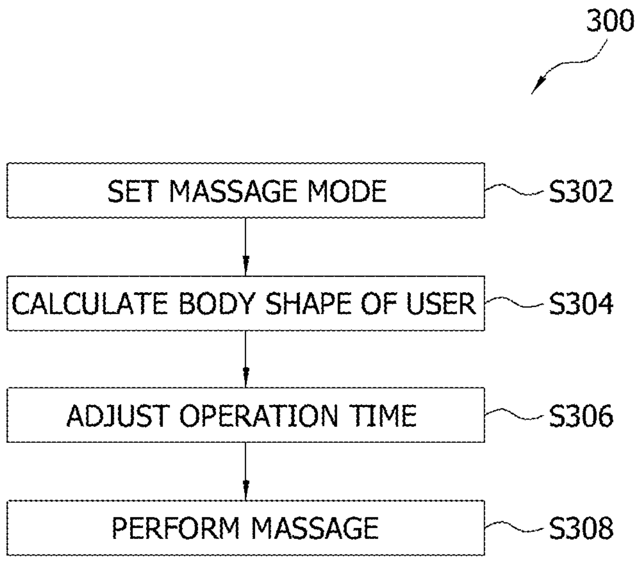
FIG. 10 is a flow chart illustrating a massager controlling method according to the embodiment of the present disclosure.

Accordingly, since the massage strength may continuously vary in the massager controlling apparatus 200, the user may easily select desired massage strength according to the body shape or a health condition. Hereinafter, a massager controlling method of the present disclosure will be described with reference to FIGS. 10 and 11. FIG. 10 is a flow chart illustrating the massager controlling method according to the embodiment of the present disclosure. Here, a massager controlling method 300 is to unify massage speeds regardless of the body shape of the user or provide the same massage pattern according to times set by the user.

The massager controlling method 300 includes setting a massage mode (S302), calculating the body shape of the user (S304), adjusting the operation time of the massage (S306), and performing the massage (S308).

In more detail, as shown in FIG. 10, first, the massage mode is set by the user in the massager controlling apparatus 100 (S302). In this case, the massage mode may include a massage pattern, a massage strength, and a massage operation time.

Further, the massager controlling apparatus 100 scans the body of the user to calculate the body shape of the user (S304). Here, at least one of the weight and spinal length of the user may be calculated in the body shape of the user.

In this case, the weight of the user may be calculated according to the body pressure sensed by the weight sensor 18 while scanning the user using the driving module 13. Further, the spinal length of the user may be calculated according to variation of currents by sensing the currents for each location of the transferring motor 14.

In addition, the massager controlling apparatus 100 may adjust the operation time of the corresponding massage pattern on the basis of calculated body information (S306). In this case, the operation time of the corresponding massage pattern may be adjusted by adjusting the moving speed of the driving module 13. Here, as described with reference to FIGS. 5 and 6, since the moving speed of the driving module 13 varies according to the body shape of the user for the same massage pattern, the massage ending times have to be identically adjusted regardless of the user. To this end, the massage pattern set by the user may be adjusted to be ended at the same time regardless of the weight and spinal length of the user. In this case, the transferring motor 14 configured to horizontally transfer the driving module 13 may be controlled to adjust the moving speed of the driving module 13.

In more detail, first, the moving speed of the driving module 13 may be adjusted so that the moving speed of the driving module 13 may vary uniformly according to the variation of the load applied to the driving module 13 by the weight of the user. In this case, the moving speed of the driving module 13 may be controlled in real time by sensing the moving speed of the driving module 13 to follow a target moving speed.

Further, the moving speed of the driving module 13 may be calculated on the basis of the predetermined standard operation time and the spinal length of the user for the corresponding massage pattern. Here, the moving speed of the driving module 13 may be calculated in relation to the spinal length of the user and the standard operation time.

In addition, the massager controlling apparatus 100 performs the massage according to the adjusted operation time (S308). In this case, the massage may be performed with the set massage pattern and the massage strength for the adjusted operation time.

By the above method, since the accurate massage time may be controlled regardless of the body shape of user, the reliability of the massage effect may be ensured without the deviation for each user.

Meanwhile, the massager controlling method 300 may adjust the operation time of the same massage pattern according to the selection of the user.

To this end, in S302, the operation time of the corresponding massage pattern may be set by the user. In this case, one of the standard, the decrease, and the increase may be selected. Here, as described above, the standard is provided to perform the corresponding massage pattern at the same time regardless of the body shape of the user, and the decrease and the increase are provided to adjust the operation time according to the selection of the user and perform the corresponding massage pattern for the decreased or increased time in comparison with the standard.

In the embodiment, although three grades including the decrease, the standard, and the increase are shown and described, the decrease and the increase may include a plurality of grades or successive grades in an analog manner.

Further, in S306, the moving speed of the driving module 13 may be adjusted so that the corresponding massage pattern may be ended according to the operation time set by the user. That is, the moving speed of the driving module 13 may be calculated on the basis of the operation time set by the user and the spinal length of the user measured in S304. Here, the driving currents of the transferring motor 14 may be controlled to move the driving module 13 at the adjusted moving speed.

In this case, as described with reference to FIG. 7, when the massage operation time is increased, the massage pattern may be controlled to linearly increase for the time set by the user. That is, it is controlled so that the moving speed of the driving module is decreased and the massage pattern of the driving module 13 is increased in a time axis in comparison with the case of standard moving speed to maintain the same massage pattern even when the massage operation time increases.

Further, when the massage operation time is decreased, the massage pattern may be controlled to linearly decrease for the time set by the user. That is, it is controlled so that the moving speed of the driving module 13 is increased and the massage pattern of the driving module 13 is decreased in the time axis in comparison with the case of standard moving speed to maintain the same massage pattern even when the massage operation time decreases.

In this case, as described above, the speed of the driving module 13 may be adjusted by reflecting a difference between speeds of the driving module 13 due to the load applied to the driving module 13 according to the weight of the user.

Accordingly, since the massage speed may be adjusted and the same massage effect may be provide to the user according to the time desired by the user, the user convenience functions may be improved.

Figure 11:
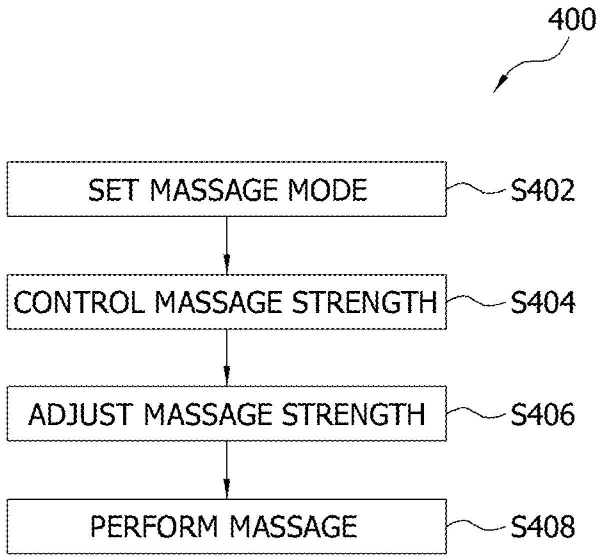
FIG. 11 is a flow chart illustrating another example of the massager controlling method according to the embodiment of the present disclosure.

Meanwhile, massager controlling method of the present disclosure may provide the massage strength as successive levels. FIG. 11 is a flow chart illustrating another example of the massager controlling method according to the embodiment of the present disclosure.

A massager controlling method 400 includes setting a massage mode (S402), controlling massage strength (S404), adjusting the massage strength (S406), and performing the massage (S408).

In more detail, as shown in FIG. 11, first, the massage mode is set by the user in the massager controlling apparatus 200 (S402). In this case, the massage strength and the massage pattern are set as the massage mode. Here, the massage strength may be set by a plurality of graded buttons type.

Further, the massager controlling apparatus 200 controls to drive the driving module 13 with the massage strength of the massage mode set by the user (S404). As described above, the user may select the increasing/decreasing of the massage strength to minutely adjust the massage strength while performing the massage with the set massage strength.

Further, the massager controlling apparatus 200 increases or decreases the moving speed of the driving module 13 according to the increasing/decreasing selection minutely adjusted by the user to adjust the massage strength of the driving module 13 (S406).

Here, since the moving speed of the driving module 13 increases or decreases for the same massage strength, the massage strength felt by the user may also increase or decrease. In this case, the moving speed of the driving module 13 and the variation amount of the massage strength may be experimentally calculated in advance to be stored.

Accordingly, the massage strength may be minutely adjusted between the graded massage strength levels by adjusting the moving speed of the driving module 13 driven with the set massage strength.

Further, the massager controlling apparatus 200 performs the massage according to the adjusted massage strength (S408). In this case, since the driving module 13 performs the massage with the set massage pattern and the determined massage strength level and the moving speed of the driving module 13 is increased, the massage may be performed with the adjusted massage strength.

Accordingly, since the massage strength may be continuously variable, the user may easily select the desired massage strength according to the body shape or the health condition.

The above described methods may be implemented by the massager controlling apparatuses 100 and 200 as shown in FIGS. 3 and 8 and, notably, may be implemented by software programs configured to perform the steps, and in this case, the programs may be stored in a recording medium readable by a computer or transmitted by computer data signals mixed with a carrier wave in transmission media or a network.

In this case, the record medium readable by the computer includes all kinds of recording devices in which data readable by a computer system is stored, for example, a ROM, a RAM, a CD-ROM, a DVD-ROM, a DVD-RAM, a magnetic tape, a floppy disk, a hard disk, an optical data storage device, etc.

In a massager controlling apparatus according to an embodiment of the present disclosure and a method thereof, since an accurate massage time can be controlled regardless of a body shape of user by controlling a speed of a driving module according to the body shape of the user, reliability of a massage effect can be ensured without deviation for each user.

Further, in the present disclosure, since a massage speed can be adjusted and the same massage effect can be provided to the user according to a time desired by the user by performing the same massage pattern according to the time selected by the user, user convenience functions can be improved.

In addition, in the present disclosure, since massage strength can be continuously variable by gradationally implementing the massage strength by the driving module and adjusting the speed of the driving module to implement medium massage strength, the user can easily select the desired massage strength according to the body shape or the health condition.

Although one embodiment of the present disclosure is described above, the spirit of the present disclosure is not limited to the embodiment shown in the description, and although those skilled in the art may provide other embodiments due to addition, change, or removal of the components within the scope of the same spirit of the present disclosure, the above embodiments are also included in the scope of the spirit of the present disclosure.

What is claimed is:

1. A massager controlling apparatus comprising:

a setting unit comprising one or more switches for setting a massage mode including a massage pattern and an operation time corresponding to the massage pattern of one cycle according to a user's input; and a control unit configured to;

control a moving speed of a driving module based on the standard operation time, wherein the control unit includes:

a body shape calculation unit configured to scan a body of the user to calculate a body shape information including a weight and a spinal length of the user; and a time adjusting unit configured to adjust the moving speed of the driving module so that the massage pattern is ended at the operation time regardless of the body shape information, increase a massage operation time for detailed massage in comparison with the operation time, linearly increase one cycle of the massage pattern based on the increased massage operation time in comparison with the operation time, decrease the moving speed of the driving module so that one cycle of the massage pattern is performed according to the increased massage operation time, and decrease the massage operation time for quick massage in comparison with the operation time, linearly decrease one cycle of the massage pattern based on the decreased massage operation time in comparison with the operation time, increase the moving speed of the driving module so that one cycle of the massage pattern is performed according to the decreased massage operation time.

2. The massager controlling apparatus of claim 1, wherein the control unit controls a transferring motor configured to horizontally transfer the driving module to adjust the moving speed of the driving module.

3. The massager controlling apparatus of claim 1, wherein:

the setting unit includes a strength selection unit configured to select strength of the massage mode and a strength increasing/decreasing selection unit configured to select increasing/decreasing of the selected massage strength to minutely adjust the massage strength; and the control unit includes a strength control unit configured to control the driving module so that the driving module is driven at the selected massage strength and a strength adjusting unit configured to increase or decrease the moving speed of the driving module according to the increasing/decreasing selection to adjust the massage strength.

4. The massager controlling apparatus of claim 3, wherein the strength increasing/decreasing selection unit selects the massage strength in an analog manner.

5. A massager controlling method comprising:

setting a massage mode including a massage pattern and an operation time corresponding to the massage pattern of one cycle according to a user's input;

scanning a body of the user for calculating body shape information including a weight and a spinal length of the user; and controlling a moving speed of a driving module based on the calculated body shape information and adjusting the operation time of the massage pattern, wherein the moving speed of the driving module is adjusted so that the massage pattern of is ended at the operation time regardless of the body shape information, increasing a massage operation time for detailed massage in comparison with the operation time, linearly increasing one cycle of the massage pattern based on the increased massage operation time in comparison with the operation time, decreasing the moving speed of the driving module so that one cycle of the massage pattern is performed according to the increased massage operation time, and decreasing the massage operation time for quick massage in comparison with the operation time, linearly decreasing one cycle of the massage pattern based on the decreased massage operation time in comparison with the operation time, increasing the moving speed of the driving module so that one cycle of the massage pattern is performed according to the decreased massage operation time.

6. The method of claim 5, wherein the adjusting the operation time of the massage pattern includes controlling a transferring motor configured to horizontally transfer the driving module to adjust the moving speed of the driving module.

7. The massager controlling apparatus of claim 1, wherein the one or more switches comprise a button-type switch.

8. The massager controlling apparatus of claim 1, wherein the one or more switches comprise a dial-type switch.

9. The massager controlling apparatus of claim 1, wherein the setting unit comprises a display unit that displays the operation time.

10. The massager controlling apparatus of claim 1, wherein:

performing the linearly increased one cycle of the massage pattern comprises performing the one cycle of massage pattern in the increased massage operation time and completing the one cycle of massage pattern at an end of the increased massage operation time, and performing the linearly decreased one cycle of the massage pattern comprises performing the one cycle of massage pattern in the decreased massage operation time and completing the one cycle of massage pattern at an end of the decreased massage operation time.

11. The method of claim 5, wherein:

performing the linearly increased one cycle of the massage pattern comprises performing the one cycle of massage pattern in the increased massage operation time and completing the one cycle of massage pattern at an end of the increased massage operation time, and performing the linearly decreased one cycle of the massage pattern comprises performing the one cycle of massage pattern in the decreased massage operation time and completing the one cycle of massage pattern at an end of the decreased massage operation time.

* * * * *